United States Patent [19]

Apfel

[11] Patent Number: 4,880,185
[45] Date of Patent: Nov. 14, 1989

[54] LOW PRESSURE REACTION CONTROL PROPULSION SYSTEM FOR A SPACECRAFT

[75] Inventor: Steven L. Apfel, Manhattan Beach, Calif.

[73] Assignee: Hughes Aircraft Company, Los Angeles, Calif.

[21] Appl. No.: 248,266

[22] Filed: Sep. 21, 1988

Related U.S. Application Data

[63] Continuation of Ser. No. 830,306, Feb. 18, 1986.

[51] Int. Cl.⁴ ................................................. B64G 1/40
[52] U.S. Cl. .................................. 244/135 B; 244/172; 60/39.48; 60/259
[58] Field of Search ........................ 244/172, 135, 158; 137/209, 590; 222/61, 394, 397, 399; 406/50, 76, 96; 60/39.48, 259

[56] References Cited

U.S. PATENT DOCUMENTS

| | | | |
|---|---|---|---|
| 2,505,798 | 5/1950 | Skinner | 222/399 |
| 2,860,651 | 11/1958 | Davies | 244/135 C |
| 3,213,804 | 10/1965 | Sobey | 60/39.48 |
| 3,286,882 | 11/1966 | Tripp | 60/259 |
| 3,296,803 | 1/1967 | Kroekel | 60/259 |
| 3,300,981 | 1/1967 | Webb . | |
| 3,517,508 | 6/1970 | Newman et al. . | |
| 3,520,137 | 7/1970 | Newman et al. . | |
| 3,527,687 | 9/1970 | Subbotin . | |
| 3,613,375 | 10/1971 | Abild | 60/39.48 |
| 3,667,216 | 6/1972 | DeMattia, Jr. et al. | 60/39.48 |
| 3,842,598 | 10/1974 | Forster | 60/39.48 |
| 3,923,188 | 12/1975 | Lake, Jr. . | |
| 4,168,718 | 9/1979 | Hess et al. . | |
| 4,385,489 | 5/1983 | Abbott | 60/39.48 |
| 4,489,745 | 12/1984 | Netter et al. | 137/590 |
| 4,609,169 | 9/1986 | Schweickert et al. | 244/172 |

FOREIGN PATENT DOCUMENTS

| | | | |
|---|---|---|---|
| 2063672 | 7/1971 | France . | |
| 2446385 | 8/1980 | France . | |
| 2051246 | 1/1981 | United Kingdom | 244/172 |

Primary Examiner—Galen L. Barefoot
Attorney, Agent, or Firm—Steven M. Mitchell

[57] ABSTRACT

A spacecraft propulsion system which integrates the function of the apogee kick motor (AKM) and reaction control system (RCS) is disclosed. In accordance with this invention, a pump-fed AKM is employed which results in lightweight main tanks and pressurization systems. The RCS thrusters are operated by small bellows tanks which are intermittently pressurized by a gas pressurization system to provide high pressure for operation of the RCS thrusters. The system according to this invention enables use of lighter weight main propellant tanks since they do not have to withstand high internal pressures and also enables realization of the numerous advantages of a pump-fed AKM. Several embodiments describe various methods for cycling the bellows tanks.

26 Claims, 6 Drawing Sheets

LOW PRESSURE REACTION CONTROL PROPULSION SYSTEM FOR A SPACECRAFT

This application is a continuation of application Ser. No. 830,306, filed Feb. 18, 1986.

BACKGROUND OF THE INVENTION

This invention relates to a spacecraft propulsion system and particularly to a propulsion system which efficiently integrates the apogee boost and reaction control propulsion system components.

Spacecraft such as unmanned satellites which must be boosted into high earth orbits such as geostationary orbits are typically injected into a low earth orbit, for example, by an unmanned launch vehicle or by a manned space shuttle orbiter. Once in the low altitude orbit, many satellites must be boosted by their own propulsion system to reach the desired final orbital position. In one type of prior art propulsion system, the satellite is boosted by first firing a solid rocket perigee kick motor which is jettisoned after it is exhausted and final orbit is achieved by firing a liquid fuel apogee kick motor (AKM). New generation satellites employ a single liquid fuel AKM to perform the orbit transfer function. Satellites boosted into high earth orbit are also equipped with a number of relatively small thrust motors which comprise the reaction control system (RCS) which is used to make fine changes in spacecraft orbit and position and for station keeping. In the design of satellites and their propulsion systems, designers are constantly striving to improve the efficiency, performance, reliability, and operational lifespan of such propulsion systems.

One type of present day satellite propulsion system integrates the fuel supply systems of the RCS and AKM. Integration is desirable to enable the RCS to take advantage of residual fuel not expended by the AKM which would otherwise be unusable if the systems were separated. Both of these propulsion systems operate by controlled mixing of a liquid fuel and oxidizer (hereinafter collectively referred to as propellant) which produces a hypergolic reaction (combustion upon contact). Fluid tanks filled with liquid fuel and oxidizer have a gas space which are initially pressurized to a high level. During AKM firing, the fuel and oxidizer tanks pressure is regulated to maintain this high pressure level using an external source of gas pressure (typically helium). When AKM firing is completed, pressure regulation of the fuel tanks is ended and the remaining propellant in the tanks is used by the RCS thrusters operating in what is known as a "blowdown" mode. As the RCS thrusters periodically consume fuel within the tanks, propellant pressure is gradually reduced to a point where efficient and reliable operation of the RCS thrusters is no longer possible. Therefore, at a given pressure level, the RCS must be deactivated even though a supply of fuel and oxidizer remains. Consequently, a greater mass of fuel and oxidizer must be carried onboard the spacecraft to insure that sufficient usable fuel and oxidizer are available for the desired RCS functions.

The present day integrated spacecraft propulsion systems of the type described above have a number of disadvantages. Since the fuel and oxidizer tanks must be designed to withstand high internal pressures, they must be very strong, thick-walled tanks having considerable mass. Furthermore, the tank pressurization system must be fairly complex in order to provide the desired level of pressurization and pressure control. The existence of residual fuel and oxidizer within the tanks decreases the total stage efficiency of the spacecraft (defined as the mass of the initial usable propellant divided by the total stage mass). Finally, thrusters which must be designed to operate over a range of supply pressures require design compromises which produce less than optimal performance. The above considerations impose fundamental limits in propulsion system efficiency and performance achievable with current integrated liquid fuel satellite propulsion systems.

Designers of spacecraft propulsion systems are now turning their attention toward designing pump-fed propulsion systems. Pump-fed systems employ a fuel-pressurizing pump which receives liquid fuel or oxidizer from the storage vessels and supplies it under pressure to the thrusters. For pump-fed systems, the liquid fuel-containing vessels need be pressurized to only a fairly low level since the only requirement is that fuel supplied to the pump must not cavitate during pumping operation. The advantages of pump-fed systems include higher performance and greater stage efficiencies. The higher stage efficiencies result from the use of lighter, thin-walled liquid tanks and a smaller, less complex tank pressurization system. Further, the pump-fed systems permit usage of nearly all of the liquid within the vessels and provide nearly uniform propellant pressures. Although the above-mentioned advantages are provided for the AKM, problems are encountered in designing the relatively small RCS thrusters to operate with the pump-fed AKM. The small RCS thrusters cannot operate from the same pumps as the AKM, as it is impractical to start and stop these relatively large pumping capacity units for each RCS maneuver. Small pumps for the RCS are not currently available and the low pressure within the propellant tanks is insufficient to operate conventional RCS thrusters. The development, testing and qualification of new RCS pumps or low pressure RCS thrusters would be an extremely expensive and time-consuming process. Therefore, it is currently impractical to integrate a pressure-fed RCS into a pump-fed AKM without modifications to the propulsion system that defeat some of the advantages inherent with the pump-fed system.

During the course of development of this invention by the inventors, a number of alternate design solutions were considered. One proposed improved propulsion system would employ a pump-fed AKM which would achieve benefits in terms of AKM performance (due to constant propellant supply pressure) and increase stage efficiency since thin-walled lightweight propellant tanks could be used. Once the AKM function is complete, the system would use a special low pressure RCS thruster which would operate in the same fashion as a conventional pressure-fed system; that is, the thruster would operate in a straight blowndown mode until its lowest operating pressure level is reached. The advantages of such a design proposal are that the system integrates the AKM and RCS propellant systems, it is no more complex than the present systems, and the stage efficiency is improved compared to current systems. This design solution, however, has several disadvantages. First, a new low pressure RCS thruster would have to be developed which would be a major and expensive undertaking. Second, thermal requirements for the propellant feed system are extremely stringent. Thruster inlet pressures of 50 psi gives RCS thruster chamber pressures of about 20 psi. The vapor pressure of one commonly used oxidizer at 100 degrees F. is 33 psi, and at 82 degrees, F. is 20 psi. If the chamber pressure equalled or approached the vapor pressure, the liquid would undergo a phase change which would interrupt operation of the thruster. Therefore, the need for precise thermal control would be necessary in order to prevent fuel vaporization within the thruster chambers. Finally, lower performance of a low pressure RCS thruster would be anticipated as compared within conventional high pressure RCS thrusters. This lower performance of the low pressure RCS thruster would increase the propellant requirements for altitude control with a compounding effect on the propellant mass necessary for AKM operation.

Another proposed design solution was to provide a non-integrated system which employs a pump-fed AKM and a separate RCS propulsion system which operates in a straight blowdown mode. Since the propellant tanks of the blowdown RCS propulsion system are considerably smaller than those needed to supply the AKM, the mass disadvantage of high pressure tankage is minimized. The pressure blowdown range of the RCS system could be from about 350 to 100 psi. The advantages of such a blowdown system is its simplicity, since no new components are needed. The major disadvantages of such a design approach are that the residuals in the AKM tanks are unusable in the RCS (because the systems are separate) and that the blowdown range of the RCS thrusters is large, giving a lower performance over the life of the spacecraft.

Still another design proposal was to incorporate an accumulator that would use either the AKM fuel pump or a smaller auxiliary pump to refill small high-pressure tanks. These tanks could be blown down normally and refilled using the pump which could be powered by spacecraft batteries. The advantages of such a system are that the primary tanks and helium system are optimized for a pump fed system. The disadvantage of this system is that the auxiliary pumps must be operated several times during the spacecraft life, which is typically about ten years. A pump design that can reliably operate over a ten-year mission has not yet been developed or qualified. If AKM pumps were used, the system would be inefficient since they have a capacity much larger than required for filling small RCS accumulators. Finally, system redundancy requires multiple pumps and highly complex manifolding and electrical systems. Accordingly, this design proposal was also determined to be unacceptable.

In view of the foregoing, there is a need to provide a highly efficient, integrated RCS/AKM propulsion system which provides the advantages of a pump-fed AKM without imposing severe limitations to the RCS function or require design changes which defeat the advantages of a pump-fed AKM.

SUMMARY OF THE INVENTION

The above described desirable features for a satellite propulsion system are provided in accordance with this invention by providing bellows tanks which provide pressurized propellant to the RCS. These bellows tanks are pressurized by an auxiliary gas pressurization system which enables fuel and oxidizer to be pressurized to a high level for efficient operation of the RCS. The bellows tanks provide a small volume of pressurized propellant and must be therefore cycled to refill once the propellant is consumed. Various means for cycling the bellows are described in this specification. In a first embodiment, fluid pressure differentials generated by venting the bellow tank space are employed to cycle the bellows, whereas the second embodiment employs satellite spin momentum in the bellows cycling process. Although the bellows tanks must be designed to withstand high pressure levels, they are relatively small so as to not impose significant mass penalties to the system. The propulsion system in accordance with this invention provides an integrated system which is highly efficient by taking advantage of the inherent advantages of a pump-fed AKM without posing significant limitations on the efficiency or complexity of the entire system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings in which:

DETAILED DESCRIPTION OF THE INVENTION

Figure 1:
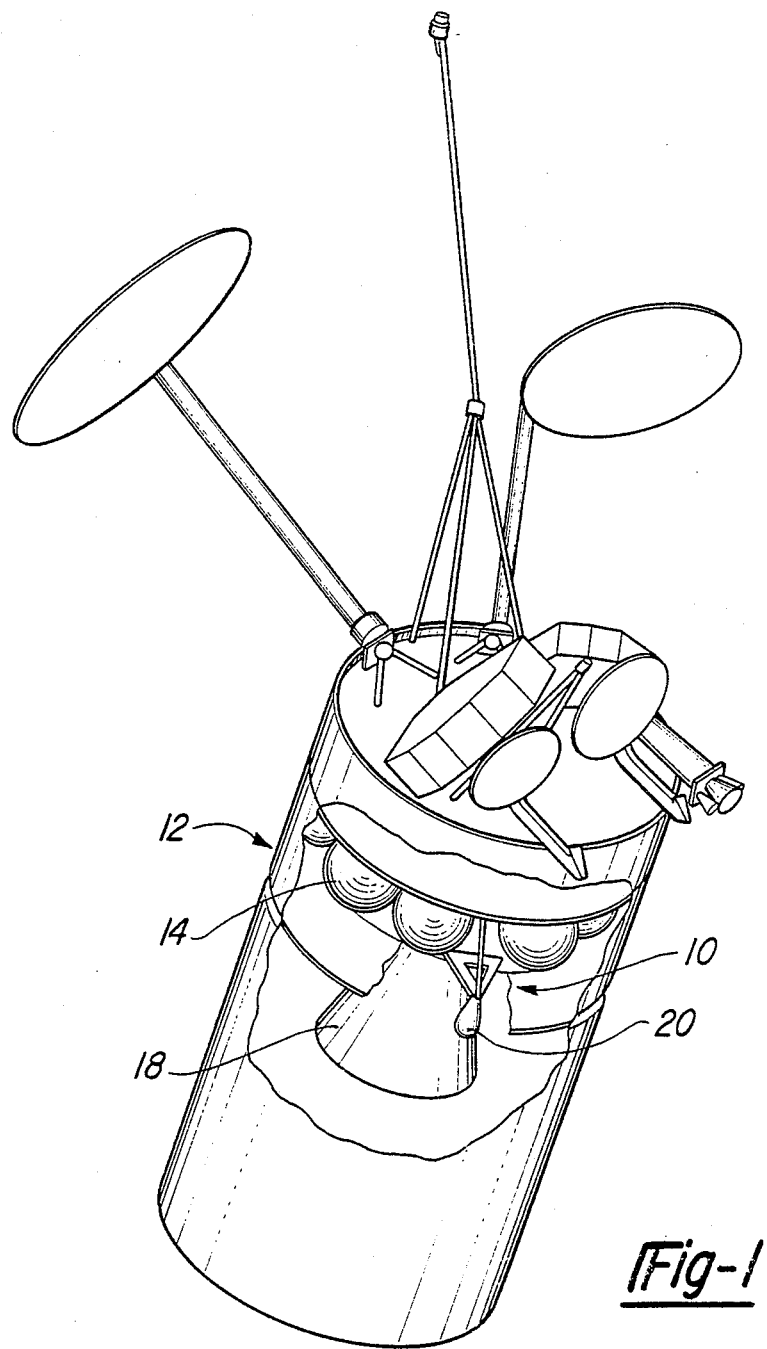
FIG. 1 is an overall pictorial view of a conventional liquid propulsion system shown installed in a representative communications satellite.
Figure 2:
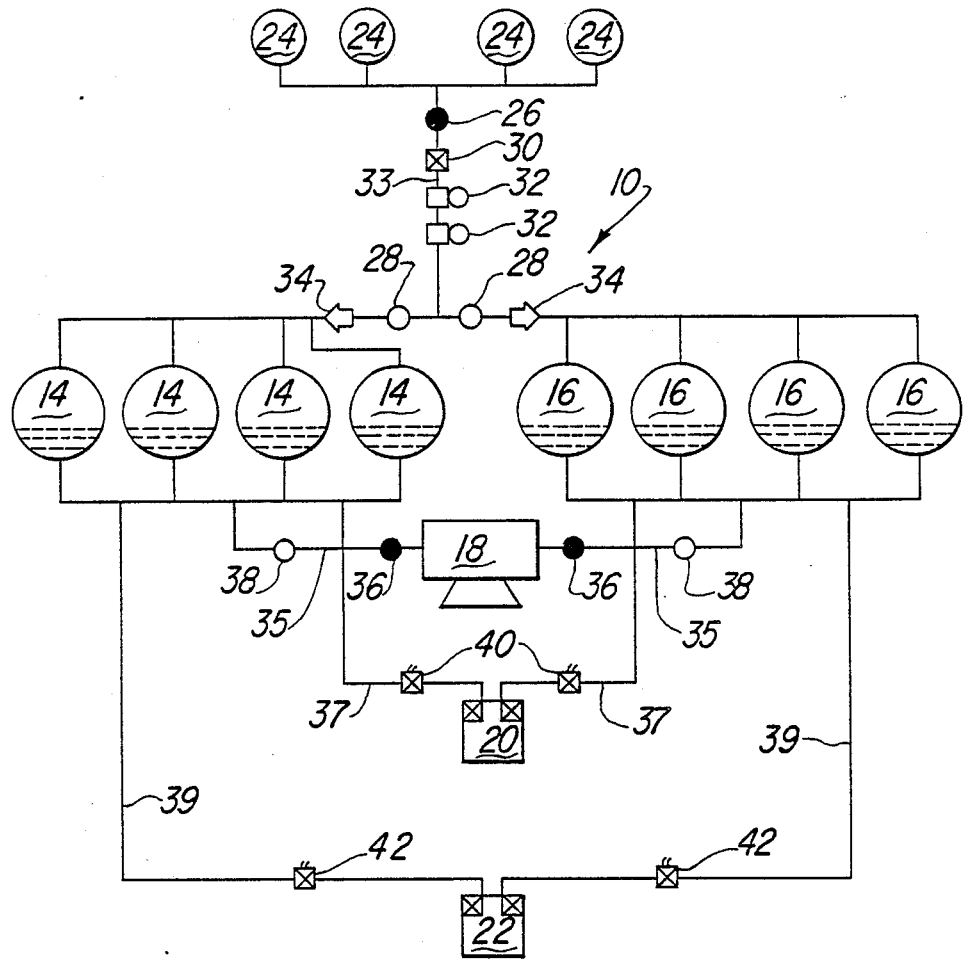
FIG. 2 is schematic version of a representation integrated RCS/AKM propulsion system according to the prior art.

FIGS. 1 and 2 illustrate a propulsion system 10 according to the prior art which is incorporated into satellite 12 which could be one of any number of types of spacecraft which are placed in orbit. As previously discussed, satellite 12 would likely be placed in a low earth orbit and propulsion system 10 would be used to boost the spacecraft to the desired orbit and orientation. As best shown in FIG. 2, propulsion system 10 comprises a plurality of fuel tanks 14 and oxidizer tanks 16 which feed AKM 18 and a pair of RCS thruster banks 20 and 22, each comprising one or more individual thrusters. The AKM nozzle and a nozzle of a RCS thruster along with several propellant tanks are shown in FIG. 1. Helium bottles 24 are employed to pressurize fuel and oxidizer tanks 14 and 16. Conduits represented by solid lines are employed to connect the various elements as shown in FIG. 2. Helium bottles 24 are connected to fuel and oxidizer tanks 14 and 16 by conduit 33 having open squib valves 28, latch valve 30, closed squib valve 26, pressure regulators 32, and check valves 34. Fuel and oxidizer are removed from the associated tanks and conducted to AKM 18 via branched conduits 35 having closed squib valves 36 and opened squib valves 38. Fuel and oxidizer are similarly conducted to a pair of RCS thruster banks 20 and 22 (each including one or more individual thrusters) by conduits 37 and 39, and their flow is controlled by latch valves 40 and 42. As described above and throughout this specification, the term "squib valve" is intended to identify a type of valve which is typically pyrotechnically activated to change its state only once from an open to a closed condition or vice versa. Latch valves are typically electrically operated valves which can move between opened and closed positions in response to control commands.

Operation of propulsion system 10 according to the prior art proceeds as follows. Fuel and oxidizers within tanks 14 and 16 are initially pressurized to approximately 260 psi. During AKM firing, squib valve 26 is energized and the pressure in tanks 14 and 16 is regulated to maintain a desired pressure by helium bottles 24 and regulators 32. Starting of AKM 18 operation is initiated by firing squib valves 36. Once the AKM 18 operation is completed, squib valve 38 is fired to prevent propellant leakage. When the apogee function is completed, pressure regulation of tanks 14 and 16 is stopped by firing squib valves 28 and the remaining propellants within the tanks are used by RCS thruster banks 20 and 22. Operation of RCS proceeds in a straight blowdown mode, i.e., liquid is supplied from the tanks at whatever pressure is available within the tanks. Present design RCS thrusters are able to operate at supply pressures down to approximately 130 psi. Consequently, once the blowdown ratio of 2:1 is achieved (260 psi initial pressure reduced to 130 psi), efficient operation of the RCS ceases. As previously described, the present propulsion system 10 possesses inherent inefficiencies due to the existence of residual fuel within tanks 14 and 16. The necessity of using relatively thick-walled and therefore heavy tanks 14 and 16, which are required to withstand the internal pressures to which they are subjected also limits the efficiency of this prior art propulsion system. Moreover, certain design tradeoffs are present when designing thrusters for RCS banks 20 and 22, which must be operated over a range of supply pressures.

Figure 3:
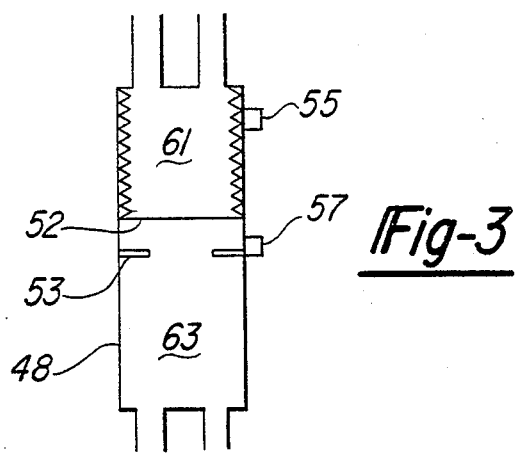
FIG. 3 is a schematic view of the bellows tank component of the propulsion system in accordance with this invention.

A propulsion system 46 in accordance with the first embodiment of this invention is shown in FIGS. 3 through 8. Those components of propulsion system 46 which are substantially identical to elements of prior art system 10 are designated by like reference numbers. For illustration purposes, propulsion system 46 is shown in simplified form in these Figures in that only a single thruster 56 and only one of the fuel or oxidizer supply systems is shown since they are identical. Propulsion system 46 employs a pump-fed AKM and an RCS thruster system which is fed by refillable bellows tank 48. As best shown in FIG. 3, bellows tank 48 is provided having an internal collapsible bellows 52. A mechanical stop 53 is provided to limit the maximum extension of bellows 52 and a pair of limit switches 55 and 57 are provided to sense the position of the bellows. Switches 55 and 57 may be of any known type of position sensing element such as microswitches, proximity switches, light interrupters, etc. Helium gas is supplied by bottle 24 at a high pressure and is conducted to the inside of bellows tank 48 and outside of bellows 52 (hereinafter gas side 63) which urges the bellows to collapse, whereas the internal volume of bellows 52 (hereinafter propellant side 61) communicates with a fuel or oxidizer tank 14 or 16 and to RCS thruster 56. Another embodiment of this invention could feature a bellows tank and bellows wherein gas side 63 is inside the bellows and propellant side 61 is outside the bellows. Regulators 58 and valve 59 are provided in conduit 65 which supplies helium to bellows tank 48. Check valve 60 prevents reverse flow of fuel or oxidizer from tanks 14 or 16 in conduit 67, and valve 62 modulates the flow of propellant through conduit 69 to RCS thruster 56. Vent 64 and valve 66 are provided within conduit 71 communicating with gas side 63 of bellows tank 48. As will be explained in greater detail below, vent 64 is used to exhaust gas side 63 to space. In order to prevent freezing of vent 64 caused by rapid expansion of gas through the vent, an orifice or another type of gas flow restrictor may be provided.

Figure 4:
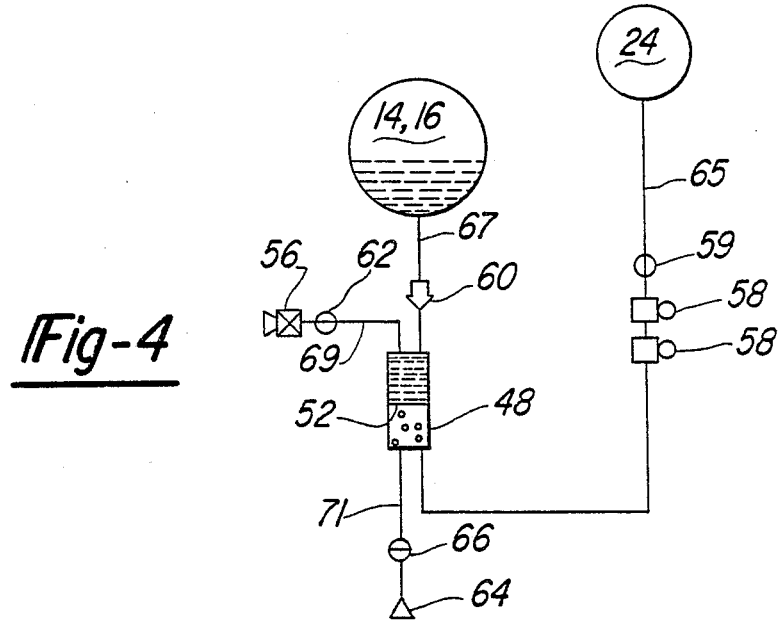
FIG. 4 is a simplified schematic representation of the propulsion system in accordance with a first embodiment of this invention showing the bellows supplying propellant to a thruster.

Operation of propulsion system 46 will now be described with reference to FIGS. 4 through 7. Tanks 14 and 16 are initially pressurized prior to launch and bellows tank propellant side 61 is initially filled with propellant. FIG. 4 illustrates the condition of the components during launch of satellite 12 or during RCS thruster 56 firing. Valve 66 is closed and helium under pressure is provided to gas side 63 of bellows tank 48 by opening valve 59. The pressure of helium in bellows tank 48 would be regulated to preferably about 260 psi. This gas pressure therefore provides the same (or slightly reduced) pressure of fuel or oxidizer to RCS thruster 56. RCS thruster 56 is permitted to burn and consume the propellant within bellows tank propellant side 61. As an alternate operating scheme, once gas side 63 of bellows tank 48 is pressurized, valve 59 could be closed and the bellows tank would be operated in a blowdown mode. Preferably, if operated in a blowdown mode, bellows 52 would be blown down to a range of 2:1 or less in order to avoid thruster performance penalties. Valve 62 is operated to regulate the flow of propellant to RCS thruster 56.

Figure 5:
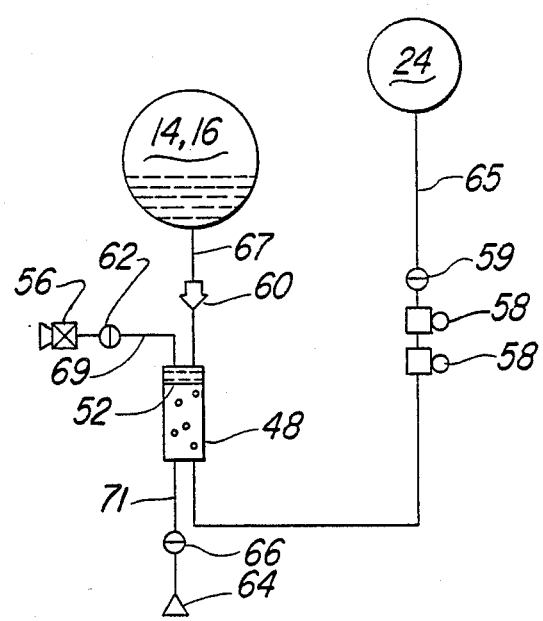
FIG. 5 is a simplified schematic representation of the propulsion system shown in FIG. 4 showing the bellows in a venting mode.
Figure 6:
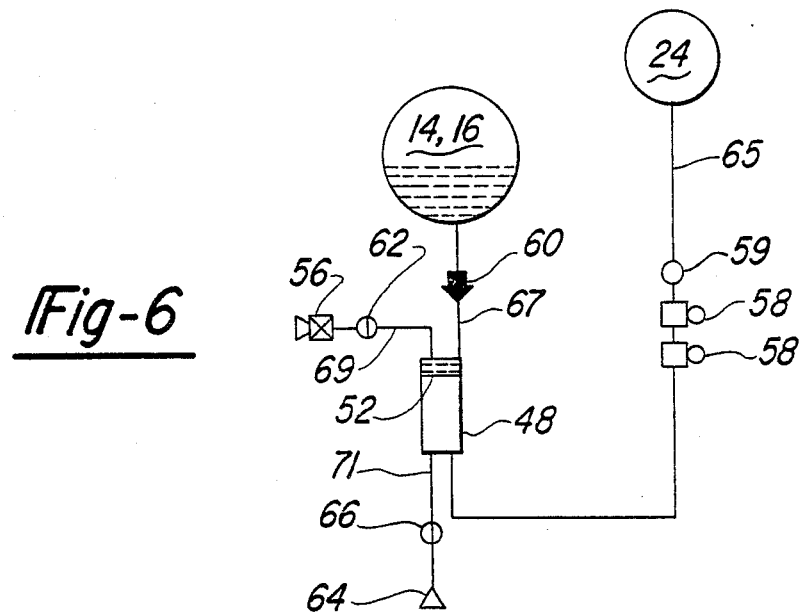
FIG. 6 is a simplified schematic representation of the propulsion system shown in FIG. 3 showing the bellows in a refilling mode.

FIG. 5 illustrates the condition of components of propulsion system 46 once fuel within bellows tank 48 has been consumed by RCS thruster 56 (or once the blowdown range is reached). Now with reference to FIG. 6, once this condition is achieved as indicated by limit switch 55, valve 59 is closed and valve 66 opens to vent gas side 63 of bellows tank 48 to space. Once gas side 63 is vented, bellows 52 is exposed to a lower pressure on the gas side than on propellant side 61, since the propellant tank 14 or 16 is pressurized to a low level, causing the bellows to expand. Once this condition is achieved, check valve 60 opens and bellows 52 is refilled until the bellows reaches positive stop 53.

Figure 7:
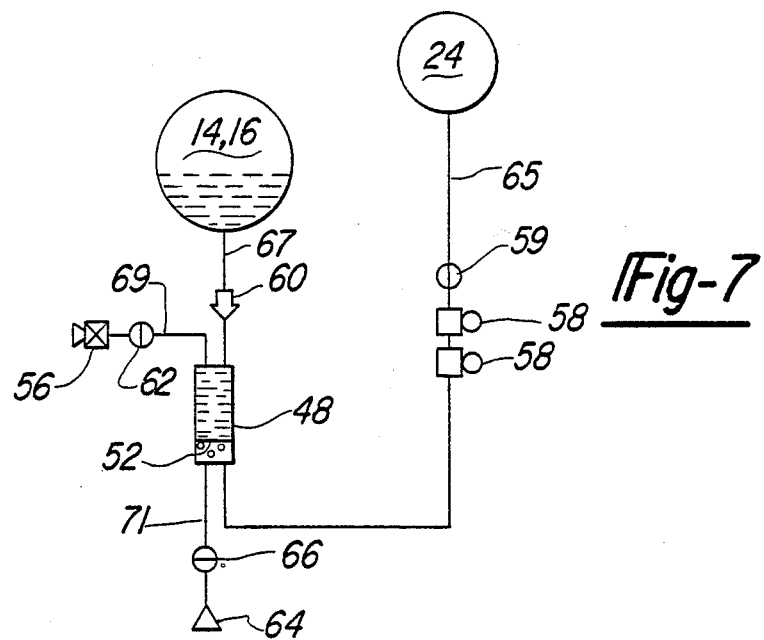
FIG. 7 is a schematic view of the propulsion system shown in FIG. 3 showing the bellows repressurized.

Once bellows 52 is completely refilled, as indicated by limit switch 57, the configuration depicted in FIG. 7 occurs wherein valve 66 is again closed and valve 59 is opened to pressurize gas side 63 of bellows 52. As previously explained, upon bellows tank 48 repressurization, valve 59 may either be left open to enable pressure regulated operation, or shut to operate bellows 52 in a blowdown mode.

One significant advantage of the propulsion system 46 in accordance with this invention is that it allows the use of thin-walled main propellant tanks 14 and 16 for both the AKM and RCS thrusters propellant systems. This thin-walled tank capability is achievable since the main tanks are pressurized only to a level sufficient to transport propellant to the AKM pump and bellows tank 46. Although the helium system for propulsion system 46 is larger than that for some of the design proposals described previously, it is not large enough to constitute a serious design shortcoming. Another advantage of propulsion system 46 is that there are virtually no new technology requirements other than flight qualifications of bellows tank 48 and the design of appropriate valves and orifices.

Figure 8:
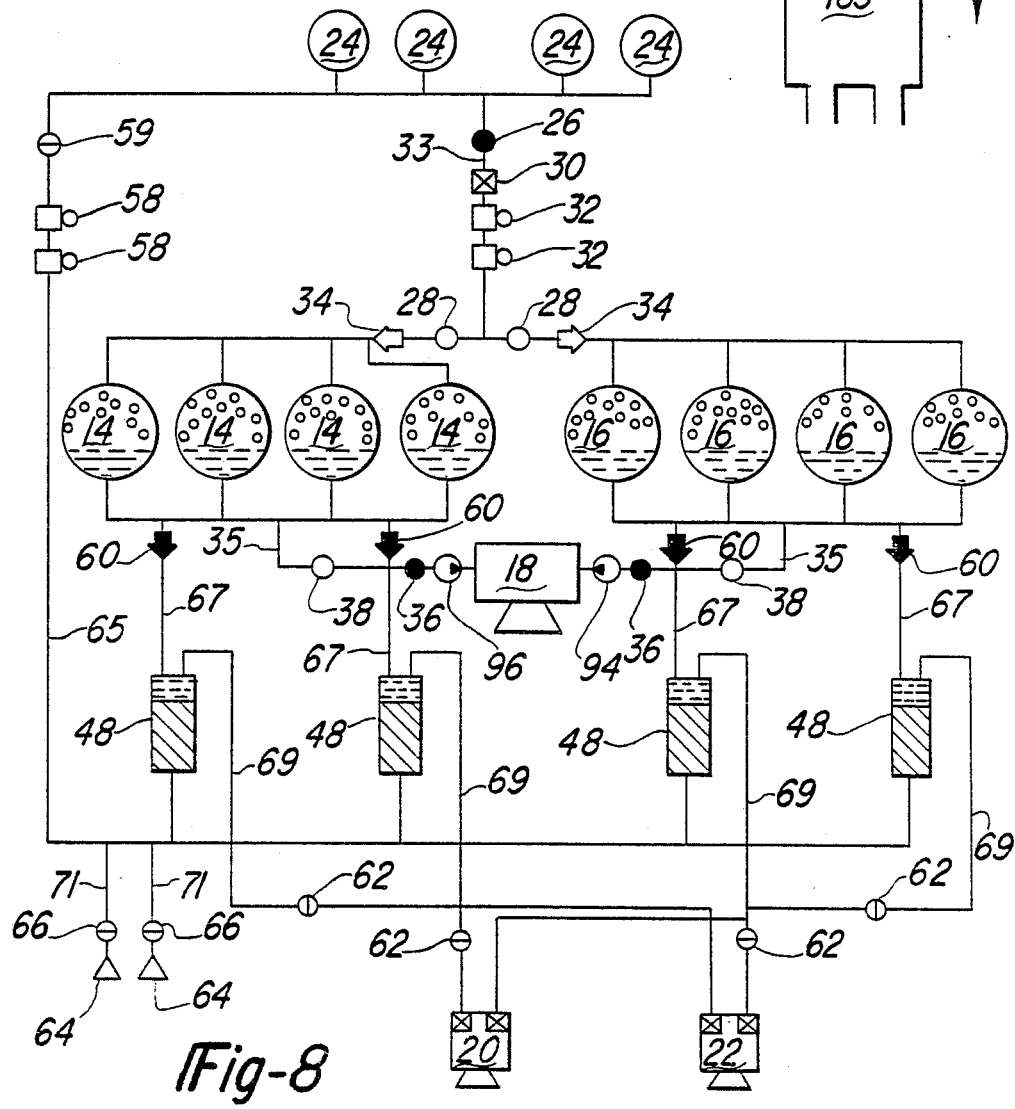
FIG. 8 is a pictorial view of a complete propulsion system of the type shown in FIG. 3 for providing propellant to a plurality of AKM and RCS thrusters.

FIG. 8 shows a complete system utilizing the principles and features of propulsion system 46. In this Figure, components which are similar to conventional components shown in FIGS. 2 through 7 are identified by the same reference numbers. As shown in FIG. 8, propulsion system 46 comprises a plurality of fuel tanks 14 and oxidizer tanks 16 which are pressurized to a low level (unlike the propulsion system shown in FIG. 2) to supply fuel and oxidizer to AKM 18. A pair of RCS thruster banks 20 and 22 are also provided. Helium bottles 24 are employed to pressurize both the fuel and oxidizer tanks 14 and 16, and bellows tanks 48, and are connected to those components by conduits 33 and 65. A low level of pressurization is provided for fuel and oxidizer tanks 14 and 16 by conduit 33 which flows through squib valve 26, latch valve 30, regulators 32, open squib valves 28 and gas check valve 34. Fuel and oxidizer are provided to AKM 18 by conduits 35 through squib valves 36 and 38 and propellant pumps 94. Fuel and oxidizer are also provided to bellows tanks 48 by conduits 67 which include check valves 60. Helium under pressure is provided to bellows tanks through conduits 65 which pass through regulators 58 and valve 59. The flow of propellant to thruster tanks 20 and 22 is controlled by valves 62 in conduit 69 and venting of bellows tank 48 is controlled by valves 66 in conduits 71. Propulsion system 46 operates precisely like the system as described in FIGS. 3 through 7 and illustrates that each RCS thruster bank 20 and 22 is provided with both fuel and oxidizer from associated bellows tanks 48.

Several improvements in the bellows RCS propulsion system 46 described above are envisioned. A very high-pressure RCS could be developed for performance higher than present systems. Bellows tanks for aircraft are presently available with high reliability for 1500 psi applications. Such a very high pressure system would require improvements in the helium pressurization system and the RCS thrusters, but the main tanks and propellant storage would be left unmodified. As many bellows tanks 48 as are necessary may be employed to provide as many RCS thruster tanks 20 and 22 with fuel and oxidizer. The bellows system could also be used as a pumpless fluid transfer system for refilling fluid tanks by using it as a positive displacement pump for propellant transfer. Bellows tanks could further be used as a balancing system by filling a bellows with a heavy material, such as mercury, and transferring it from one tank to another as a spin balance control or center of gravity shifting mechanism.

Figure 10:
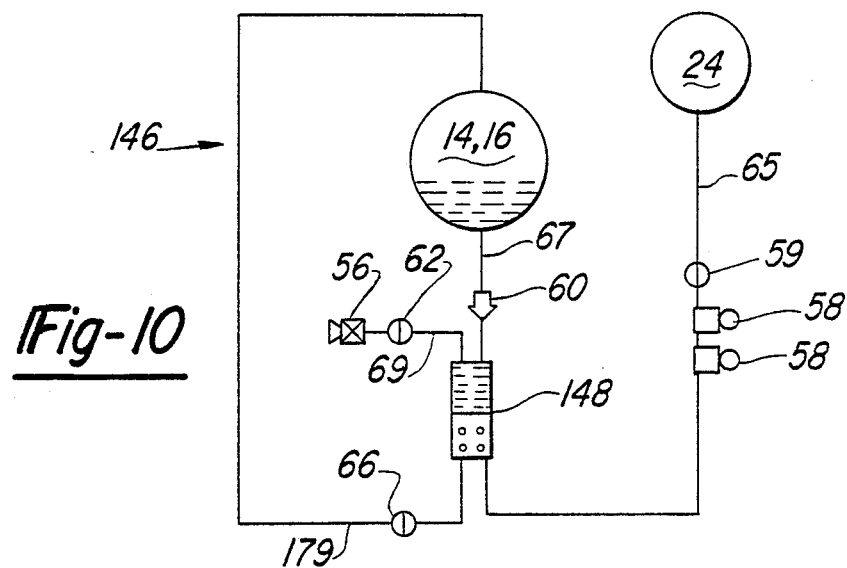
FIG. 10 is a simplified schematic representation of a propulsion system in accordance with a second embodiment of this invention employing the bellows shown in FIG. 9.
Figure 9:
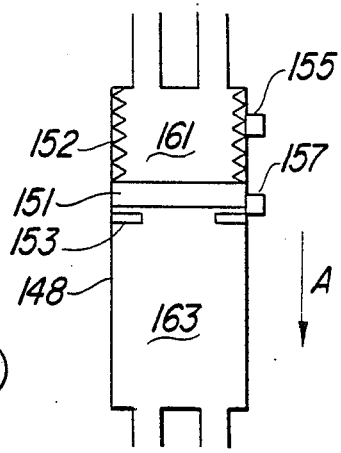
FIG. 9 is a bellows in accordance with a second embodiment of this invention.

In accordance with a second embodiment of this invention, propulsion system 146 shown in FIG. 10, like propulsion system 46, employs a bellows tank 148. This system varies principally from propulsion system 46 in that bellows tank 148 is repressurized by the spin force gradient of a rotating spacecraft 12. Propulsion system 146 also incorporates helium bottle 24 which pressurizes bellows tank 148 through conduit 65 including valve 59 and regulators 58. The contents of main tank 14 or 16 are conducted to bellows tank 148 by conduit 67 which passes through check valve 60. The fuel within bellows tank 148 is conducted to RCS thruster 56 and passes through conduit 69 and valve 62. Instead of providing a conduit (71) which vents gas side 163 of the bellows to space like the first embodiment, a conduit 179 having valve 66 is connected between gas side 163 of bellowws tank 148 and main tank 14 or 16. The details of bellows tank 148 are shown in FIG. 9 wherein bellows 152 includes mechanical stop 153, limit switches 155 and 157, and optionally includes a relatively massive piston 151. Bellows tank 148 is mounted such that the spin force gradient designated by arrow A tends to cause bellows 152 to expand.

In operation, propulsion system 146 is mounted to a spun portion of satellite 12 such that the spin force gradient is provided which acts on piston 151 and the propellant in bellows tank 148 to refill bellows propellant side 161 with propellant when necessary. As shown in FIG. 10, when it is desirable to refill bellows 152, valve 66 opens and the centrifugal force acting on piston 151 and/or any propellant in propellant side 161 produces a reduced pressure within the bellows propellant side causing fuel in the main tank 14 or 16 to refill the bellows. Otherwise, propulsion system 146 operates like system 46 previously described.

Both of the above-described embodiments according to this invention provide a number of significant advantages over present systems. The main tanks 14 and 16 of both systems 46 and 146 may be quite thin and lightweight as they only have to contain sufficient pressure (typically 50 psi) as needed to prevent cavitation at the inlets of pumps 94. Additionally, the low-pressure main tanks require less helium gas, resulting in a lightened pressurization system. The system further provides higher mean pressure of propellant to the RCS thrusters, providing higher performance. This enhanced performance gives either a lowering of the initial propellant requirements, or an increase in operational life for a given propellant loading. Further, residuals from the main tanks can be completely consumed by the RCS thrusters leaving negligible residual fuel. Therefore, if the main pump-fed AKM 18 demonstrates a higher than predicted performance, excess propellants can be used by the RCS thrusters.

While the above description constitutes the preferred embodiments of the present invention, it will be appreciated that the invention is susceptible to modification, variation and change without departing from the proper scope and fair meaning of the accompanying claims.

What is claimed is:

1. A satellite propulsion system adapted to supply liquid propellant to a first thruster at a first flow rate and to a second thruster at a second higher flow rate, comprising:
   a gas pressure source,
   a propellant tank for holding said propellant,
   a bellows tank,
   a collapsible bellows in said bellows tank which divides said bellow tank into a gas side and a propellant side, the relative volume of said gas side and said propellant side varying as said bellows collapses and expands, a first conduit communicating said propellant tank with said propellant side of said bellows tank, a first valve means in said first conduit for controlling propellant flow in said first conduit, a second conduit communicating said gas pressure source with said gas side of said bellows tank, a second valve means in said second conduit, a third conduit communicating said first thruster with said propellant side of said bellows tank, a third valve means in said third conduit for controlling the flow of propellant to said first thruster, a fourth conduit communicating said propellant tank with said second thruster, a fourth valve means in said fourth conduit for controlling the flow of propellant to said second thruster, a propellant pump in said fourth conduit for pressurizing the propellant flowing to said second thruster, a fifth conduit communicating to said gas side of said bellows tank and for venting said gas side of said bellows, and a fifth valve means in said fifth conduit wherein, when said propellant side of said bellows is filled with propellant, said gas side of said bellows may be pressurized, thereby pressurizing said propellant which is transmitted to said first thruster when said third valve means is opened, and wherein said propellant side of said bellows may be refilled with propellant by opening said fifth valve means and closing said second valve means, thereby venting said gas side of said bellows tank and enabling said propellant to refill said propellant side of said bellows tank.

2. The satellite propulsion system according to claim 1 further comprising means for pressurizing said propellant tank, thereby enabling said propellant to be conducted from said propellant tank to said propellant side of said bellows tank and to said propellant pump.

3. The satellite propulsion system according to claim 2 wherein said propellant tank is pressurized to a low pressure and said bellows tank is pressurized to a high pressure by said gas pressure source whereby said propellant tank may be designed to be lighter in weight than if said propellant tank had to withstand said high pressure, thereby reducing the overall mass of said satellite propulsion system.

4. The satellite propulsion system according to claim 1 wherein said fifth conduit is vented to space.

5. The satellite propulsion system according to claim 1 wherein said bellows tank further comprises a mechanical stop means for limiting the range of change in volume of said propellant side of said bellows tank.

6. The satellite propulsion system according to claim 1 wherein said bellows tank further comprises means for sensing the volume of propellant in said propellant side of said bellows tank.

7. The satellite propulsion system according to claim 8 wherein said means for sensing comprises a limit switch which senses the position of said bellows.

8. A satellite propulsion system adpated to supply liquid propellant to first and second thrusters, comprising:

a gas pressure source which provides gas pressure at a first predetermined magnitude, a propellant tank for holding liquid propellant, said propellant tank charged with gas at a second predetermined magnitude which is substantially less than said first predetermined magnitude such that said propellant tank may be designed to weigh less than if said propellant tank was exposed to said first predetermined magnitude of pressure, a propellant pump communicating with said propellant tank and with said second thruster for providing pressurized propellant to said second thruster, and a bellows tank having a collapsible bellows installed therein to divide said bellows tank into a gas side and a propellant side, the relative volume of said gas side and said propellant side varying as said bellows collapses and expands, and said propellant side communicating with said first thruster and said propellant tank and said gas side communicating with said gas pressure source, said bellows tank and said bellows adapted to be cycled to supply said propellant to said first thruster until said propellant side is emptied and thereafter refilled with said propellant.

9. The satellite propulsion system according to claim 8 further comprising:

a first conduit communicating said propellant tank with said propellant side of said bellows tank, a first valve means in said first conduit for controlling propellant flow in said first conduit, a second conduit communicating said gas pressure source with said gas side of said bellows tank, a second valve means in said second conduit, a third conduit communicating said first thruster with said propellant side of said bellows tank, a third valve means in said third conduit for controlling the flow of propellant to said first thruster, a fourth conduit communicating said propellant tank with said propellant pump and then with said second thruster, a fourth valve means in said fourth conduit for controlling the flow of propellant to said propellant pump, a fifth conduit communicating to said gas side of said bellows tank and for venting said gas side of said bellows, and a fifth valve means in said fifth conduit wherein, when said propellant side of said bellows is filled with propellant, said gas side of said bellows may be pressurized, thereby pressurizing said propellant which is transmitted to said first thruster when said third valve means is opened, and wherein said propellant side of said bellows may be refilled with propellant by opening said fifth valve means and closing said second valve means, thereby venting said gas side of said bellows tank and enabling said propellant to refill said propellant side of said bellows tank.

10. The satellite propulsion system according to claim 8 wherein said fifth conduit is vented to space.

11. The satellite propulsion system according to claim 8 wherein said bellows tank further comprises a mechanical stop means for limiting the range of change in volume of said propellant side of said bellows tank.

12. The satellite propulsion system according to claim 8 wherein said bellows tank further comprises means for sensing the volume of propellant in said propellant side of said bellows tank.

13. The satellite propulsion system according to claim 12 wherein said means for sensing comprises a limit switch which senses the position of said bellows.

14. A method of operating a satellite propulsion system of the type including a gas pressure source, and a propellant tank for holding liquid propellant, comprising the steps of:
  providing a bellows tank having a collapsible bellows installed therein to divide said bellows tank into a gas side and a propellant side, the relative volume of said gas side and said propellant side varying as said bellows collapses and expands, and said propellant side communicating with a first thruster and said propellant tank and said gas side communicating with said gas pressure source, said propellant tank further communicating with a second thruster through a propellant pump,
  transmitting said propellant to said second thruster by activating said pump and controlling the flow of propellant to said pump,
  transmitting said propellant to said first thruster by:
    pressurizing said gas sdie of said bellows tank with said gas pressure source,
    controlling the flow of said propellant from said propellant side of said bellows tank to said first thruster, and
  refilling said propellant side of said bellows tank by:
    venting said gas side of said bellows tank such that the pressure in said gas side is less than the pressure of said propellant in said propellant tank, whereby said propellant flows into said propellant side of said bellows tank.

15. The method of operating a satellite propulsion system according to claim 14 wherein:
  pressurizing said gas side of said bellows tank occurs by providing a relatively constant pressure from said gas pressure source throughout said transmitting of said propellant to said first thruster.

16. The method of operating a satellite propulsion system according to claim 14 wherein:
  pressurizing said gas side of said bellows tank occurs by providing pressure to said gas side of said bellows only when said propellant side of said bellows is completely refilled, said bellows thereafter operating in a blow down mode as said propellant is transmitted to said first thruster.

17. The method of operating a satellite propulsion system according to claim 14, further comprising the steps of:
  sensing the position of said bellows in said bellows tank to control said transmitting said propellant and said refilling said propellant steps.

18. The method of operating a satellite propulsion system according to claim 14 wherein said venting gas side of said bellows occurs by exposing said propellant side of said bellows tank to space.

19. A satellite propulsion system for a satellite having a spun portion adapted to supply liquid propellant to one or more thrusters, comprising:
  a gas pressure source,
  a propellant tank for holding said propellant,
  a bellows tank mounted on said spun portion,
  a collapsible bellows in said bellows tank which divides said bellow tank into a gas side and a propellant side, the relative volume of said gas side and said propellant side varying as said bellows collapses in response to gas pressure from said gas side and expands in response to centrifugal force acting upon said bellows,
  a first conduit communicating said propellant tank with said propellant side of said bellows tank,
  a first valve means in said first conduit for controlling propellant flow in said first conduit,
  a second conduit communicating said gas pressure source with said gas side of said bellows tank,
  a second valve means in said second conduit,
  a third conduit communicating said thruster with said propellant side of said bellows tank,
  a third valve means in said third conduit for controlling the flow of propellant to said thruster,
  a fourth conduit communicating from said gas side of said bellows tank to said propellant tank for venting said gas side of said bellows, and
  a fourth valve means in said fourth conduit wherein, when said propellant side of said bellows is filled with propellant, said gas side of said bellows may be pressurized, thereby pressurizing said propellant which is transmitted to said thruster when said third valve means is opened, and wherein said propellant side of said bellows may be refilled with propellant by opening said fourth valve means and closing said second valve means, thereby venting said gas side of said bellows tank to said propellant tank and enabling said propellant to refill said propellant side of said bellows tank.

20. The satellite propulsion system according to claim 19 wherein a mass is affixed to said bellows to increase the magnitude of centrifugal force acting on said bellows.

21. A satellite propulsion system adapted to supply liquid propellant to one or more thrusters of a satellite having a spun portion, comprising:
  a gas pressure source which provides gas pressure at a first predetermined magnitude,
  a propellant tank for holding liquid propellant, said propellant tank charged with gas at a second predetermined magnitude which is substantially less than said first predetermined magnitude such that said propellant tank may be designed to weigh less than if said propellant tank was exposed to said first predetermined magnitude of pressure, and
  a bellows tank mounted on said spun portion of said satellite and having a collapsible bellows installed therein to divide said bellows tank into a gas side and a propellant side, the relative volume of said gas side and said propellant side varying as said bellows collapses due to gas pressure on said gas side and expands due to centrifugal force, and said propellant side communicating with said thruster and said propellant tank and said gas side communicating with said gas pressure source, said bellows tank and said bellows adapted to be cycled to supply said propellant to said thrusters until said propellant side is emptied and thereafter refilled with said propellant.

22. The satellite propulsion system according to claim 21 wherein a mass is affixed to said bellows to increase the magnitude of centrifugal force acting on said bellows.

23. A method of operating a propulsion system for a satellite having a spun portion of the type including a gas pressure source, and a propellant tank for holding liquid propellant, comprising the steps of:
  providing a bellows tank on said spun portion and having a collapsible bellows installed therein to divide said bellows tank into a gas side and a propellant side, the relative volume of said gas side and said propellant side varying as said bellows collapses and expands, and said propellant side communicating with a thruster and said propellant tank and said gas side communicating with said gas pressure source, transmitting said propellant to said thruster by:
pressurizing said gas side of said bellows tank with said gas pressure source,
controlling the flow of said propellant from said propellant side of said bellows tank to said thruster, refilling said propellant side of said bellows tank by:
venting said gas side of said bellows tank such that the pressure in said gas side is less than the combination of the pressure of said propellant in said propellant tank and centrifugal force on said bellows from the spinning of said spun portion, whereby said propellant flows into said propellant side of said bellows tank.

24. The method of operating a satellite propulsion system according to claim 23 wherein:
pressurizing said gas side of said bellows tank occurs by providing a relatively constant pressure from said gas pressure source throughout said transmitting of said propellant to said thruster step.

25. The method of operating a satellite propulsion system according to claim 23 wherein:
pressurizing said gas side of said bellows tank occurs by providing pressure to said gas side of said bellows only when said propellant side of said bellows is completely refilled, said bellows thereafter operating in a blow down mode as said propellant is transmitted to said thruster.

26. The method of operating a satellite propulsion system according to claim 23 wherein said reducing the pressure step is achieved by communicating said gas side of said bellows tank with said propellant tank.

* * * * *